(12) United States Patent
Roth

(10) Patent No.: US 7,322,739 B2
(45) Date of Patent: Jan. 29, 2008

(54) SPARGING DEVICE FOR ADDING A PROCESSING FLUID TO A FOODSTUFF

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 0 days.

(21) Appl. No.: 11/502,970

(22) Filed: Aug. 11, 2006

(65) Prior Publication Data
US 2006/0274602 A1 Dec. 7, 2006

Related U.S. Application Data

(63) Continuation of application No. 10/269,278, filed on Oct. 11, 2002, now Pat. No. 7,093,973.

(51) Int. Cl.
*B01F 5/04* (2006.01)
*B01F 15/02* (2006.01)

(52) U.S. Cl. .............. 366/173.2; 366/174.1; 366/177.1; 366/181.6

(58) Field of Classification Search ........... 366/173.2, 366/173.1, 167.1, 177.1, 181.6, 309, 174.1
See application file for complete search history.

(56) References Cited

U.S. PATENT DOCUMENTS

| | | | |
|---|---|---|---|
| 2,595,210 A | 4/1952 | Clinefelter | |
| 2,797,904 A | 7/1957 | Voorheis | |
| 2,815,532 A | 12/1957 | Braunlich | |
| 2,858,219 A * | 10/1958 | Benson | 426/93 |
| 3,064,680 A | 11/1962 | Winslow, Jr. | |
| 3,232,590 A | 2/1966 | Eckert | |
| 3,413,387 A | 11/1968 | Ohsol | |
| 3,792,839 A * | 2/1974 | Gidge | 366/87 |
| 3,936,382 A | 2/1976 | White | |
| 4,107,262 A | 8/1978 | Lueders et al. | |
| 4,212,544 A | 7/1980 | Crosby | |
| 4,567,050 A | 1/1986 | Roth | |
| 4,626,187 A * | 12/1986 | Kamada | 425/131.1 |

(Continued)

OTHER PUBLICATIONS

UNKNOWN, Mott Sparger Application: pH Control- Neutralizing Alkaline Solutions, Feb. 1996, 2 pages, Mott Industrial, Farmington, CT.

(Continued)

*Primary Examiner*—Tony G. Soohoo
(74) *Attorney, Agent, or Firm*—Russell D. Culbertson; The Culbertson Group, P.C.

(57) ABSTRACT

A sparging device (10) includes a number of sparger or screen passages (14) each extending from a respective passage inlet to a respective passage outlet. The sparging device (10) further includes a fluid chamber (25) that defines a chamber area through which at least one of the sparger passages (14) extends. A fluid communication structure (34) is associated with each sparger passage (14) extending through the fluid chamber (25) to enable fluid communication between the fluid chamber and the interior of the respective sparger passage. The sparging device (10) allows a processing fluid in the fluid chamber (25) to be added to a foodstuff pumped through the sparger passages (14). Multiple fluid chambers may be formed in the sparging device to facilitate the addition of multiple processing fluids to a foodstuff.

20 Claims, 3 Drawing Sheets

U.S. PATENT DOCUMENTS

| | | |
|---|---|---|
| 4,758,097 A | 7/1988 | Iles, Sr. |
| 5,106,240 A | 4/1992 | Dirkse et al. |
| 5,374,405 A | 12/1994 | Firnberg et al. |
| 5,556,200 A * | 9/1996 | Ekholm et al. .......... 366/175.2 |
| 5,639,485 A * | 6/1997 | Weinstein et al. ....... 425/131.1 |
| 5,660,039 A * | 8/1997 | Sion et al. .................... 60/258 |
| 5,853,576 A | 12/1998 | Kapulnik et al. |
| 5,863,587 A | 1/1999 | Badertscher et al. |
| 5,871,795 A | 2/1999 | Roth |
| 5,919,509 A | 7/1999 | Cremers et al. |
| 6,132,079 A | 10/2000 | King |
| 6,142,067 A | 11/2000 | Roth |
| 6,170,979 B1 * | 1/2001 | Smeaton .................. 366/173.1 |
| 6,389,838 B1 | 5/2002 | Roth |
| 7,093,973 B2 * | 8/2006 | Roth ....................... 366/167.1 |
| 2003/0017252 A1 | 1/2003 | Roth |

OTHER PUBLICATIONS

UNKNOWN, Sparging/Gas-Liquid Contacting Design Guide & Part Selection, Feb. 1996, 11 pages, Mott Corporation, Farmington, CT.

UNKNOWN, A Guide to Advanced Steam Sparging, Feb. 1996, 6 pages, Mott Industrial, Farmington, CT.

* cited by examiner

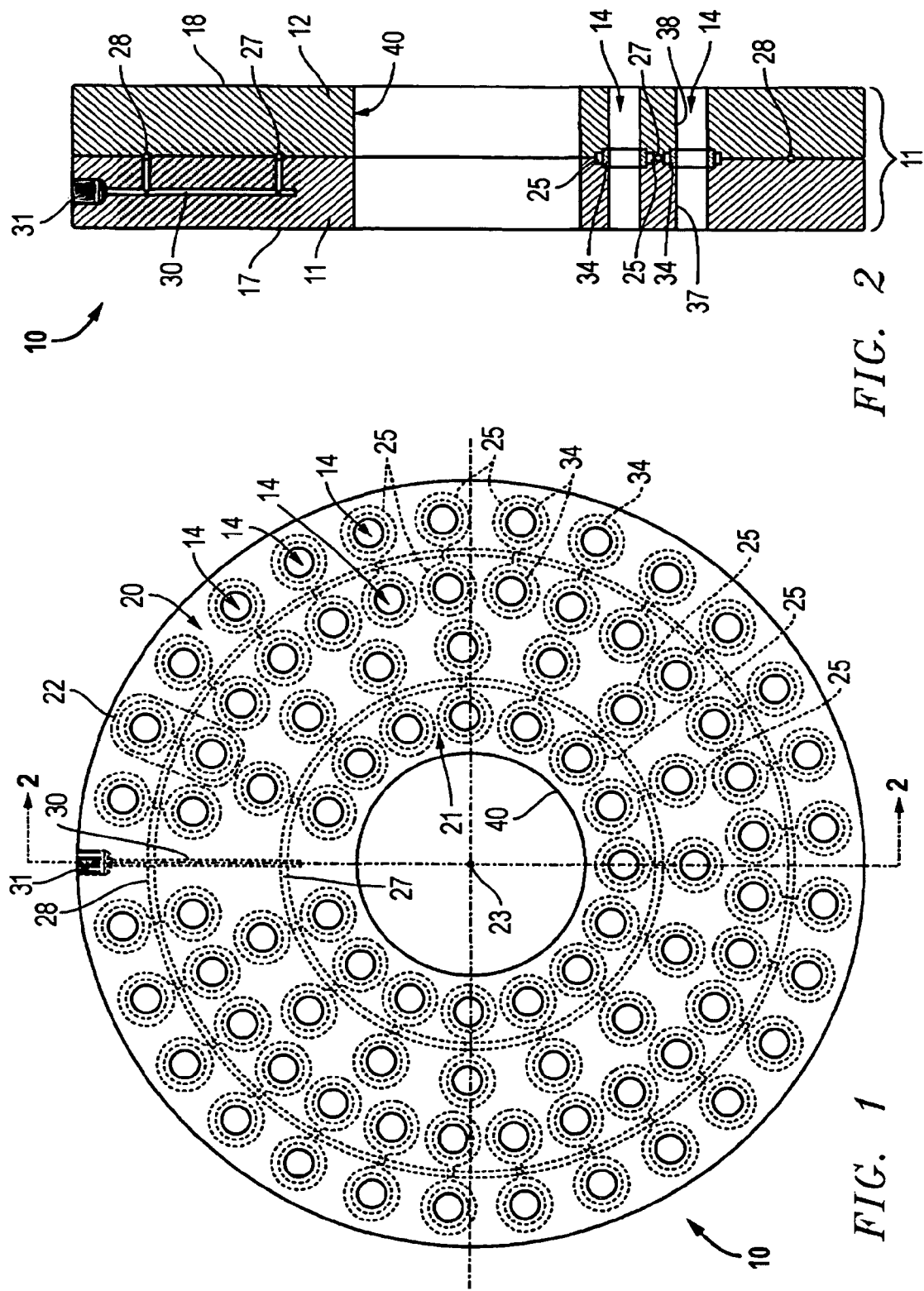

SPARGING DEVICE FOR ADDING A PROCESSING FLUID TO A FOODSTUFF

CROSS-REFERENCE TO RELATED APPLICATION

This application is a continuation of U.S. patent application Ser. No. 10/269,278, filed Oct. 11, 2002, entitled "Sparging Device And Method For Adding A Processing Fluid To A Foodstuff, now U.S. Pat. No. 7,093,973 B2. The benefit of this prior application is hereby claimed in the present application pursuant to 35 U.S.C. §120. The entire content of this prior application is incorporated herein by this reference.

TECHNICAL FIELD OF THE INVENTION

This invention relates to food processing systems. More particularly, the invention relates to devices and methods for adding a processing fluid to a foodstuff in a food processing system.

BACKGROUND OF THE INVENTION

Many food processing operations require adding a processing fluid or other material to a foodstuff. The traditional method for adding materials to a foodstuff comprises placing the foodstuff together with the material to be added in a suitable mixing vessel and then mixing the two materials together. This mixing process is well adapted for many applications, but may over-work the foodstuff and produce undesirable results in some cases.

U.S. Pat. No. 5,871,795 discloses an apparatus and process for adding pH modifying materials to foodstuffs, particularly comminuted meats. The system disclosed in U.S. Pat. No. 5,871,795 applies the pH increasing or pH decreasing material in gaseous form. Ammonia gas is given as a specific example of a pH increasing gas useful in the system, while carbon dioxide gas is listed as an example of a pH decreasing gas that may used in the system. Modifying the pH of the foodstuff in the process described in U.S. Pat. No. 5,871,795 has been shown to reduce microbe counts in the foodstuff and may have other benefits in processing the foodstuff.

U.S. Pat. No. 6,142,067 discloses a system for adding ammonia to finely comminuted meats. In this apparatus, the comminuted meat is pumped through a narrow conduit, a portion of which passes adjacent to a chamber containing the ammonia. A number of small openings extend from the ammonia chamber to the interior of the conduit and provide fluid communication from the ammonia chamber to the conduit. This arrangement of a meat conduit, ammonia chamber, and openings from the chamber to the conduit may be referred to as a sparger or sparging device. The pressure is regulated in the ammonia chamber to cause the desired amount of ammonia to be "sparged" into the foodstuff, that is, to flow through the small fluid communication openings into the meat conduit and make contact with the meat product.

In the system shown in U.S. Pat. No. 6,142,067, the meat product and added ammonia is directed through a grinder or other similar device. Grinding or otherwise further comminuting the foodstuff after addition of ammonia operates to evenly distribute the ammonia throughout the comminuted meat. This system of adding ammonia to comminuted meat and then further comminuting the meat has been shown to provide a substantially even pH increase throughout the comminuted meat and allows significant pH increases without leaving the meat with an ammonia odor.

The systems shown in U.S. Pat. Nos. 5,871,795 and 6,142,067 work well for adding a processing fluid to a foodstuff, especially comminuted meats. However, it is desirable to provide alternative arrangements for quickly and uniformly adding various processing fluids to foodstuffs. It is also desirable to provide an arrangement for adding several different processing fluids to a foodstuff in rapid succession.

SUMMARY OF THE INVENTION

The present invention includes a sparging device having a number of sparger or screen passages each extending from a respective passage inlet to a respective passage outlet. The sparging device further includes a fluid chamber that defines a chamber area through which at least one, and preferably each, sparger passage extends. A fluid communication device, which may be referred to herein as a "fluid communication structure," is associated with each sparger passage extending through the chamber area to enable fluid communication between the fluid chamber and the interior of the respective sparger passage.

The portion of the present sparging device defining the various sparger passages and fluid chamber may be configured as a screen such as a grinder screen or grinder plate used in a foodstuff grinding device. In this configuration, the inlet or first side of the portion of the sparging device containing the sparger passages may include a cutting surface over which a suitable cutting or scraping blade passes periodically. The sparging device may include an inlet chamber at this inlet side of the device from which a foodstuff may be forced into and through the various sparger passages. In one form of the invention, a pressure auger may apply pressure to the foodstuff in the inlet chamber to force the material into the sparger passages, and a cutting blade may be adapted to rotate with the pressure auger to provide the desired cutting action at the inlet end of the sparger passages.

A sparging device within the scope of the present invention may be configured with two or more separate fluid chambers defined in the device body. Each separate fluid chamber may include a separate fluid communication structure with each sparger passage. The different fluid chambers may be used to add different processing fluids to the foodstuff as it flows through the sparger passages. Including multiple fluid chambers in the sparging device according to the invention allows different processing fluids to be quickly and efficiently added to the foodstuff in rapid succession.

The sparging screen, that is, the portion of the sparging device defining the sparger passages, may be made up of two or more different components which are bolted or otherwise connected together to define the fluid chamber or chambers of the device. Each component of this arrangement will include a number of openings with each opening generally defining a portion of each sparger passage. These openings through the separate components generally align when the components are connected together. Also, where the sparging device according to the invention includes a cutting blade acting at the inlet end of the sparger passages, the device may include a separate cutting plate component. This cutting plate component also includes a number of openings aligning with the openings of the other components.

According to the invention, a separate sleeve of material is sandwiched between two adjacent components of the sparger or screen body to form a portion of the sparger passage through the components. The fluid communication structure may be included in each sleeve, and may include a number of openings extending transversely through the sleeve material. In one preferred form of the invention, each sleeve includes one or more areas of porous and permeable material through which the processing fluid may pass from the respective fluid chamber into the interior of the fluid passage defined by the sleeve.

The sparging device according to the present invention allows one or more processing fluids to be quickly and efficiently added to the foodstuff being processed. Applying the processing fluids through fluid communication structures associated with a number of separate sparger passages allows the processing fluid to be added evenly throughout the foodstuff as the foodstuff passes through the sparging device. This may eliminate the need for a separate mixing or comminuting step downstream from the sparging device.

These and other advantages and features of the invention will be apparent from the following description of the preferred embodiments, considered along with the accompanying drawings.

BRIEF DESCRIPTION OF THE DRAWINGS

FIG. 1 is a right end view of a sparging screen embodying the principles of the invention.

FIG. 2 is a section view taken along line 2-2 in FIG. 1.

DESCRIPTION OF PREFERRED EMBODIMENTS

Figure 3:
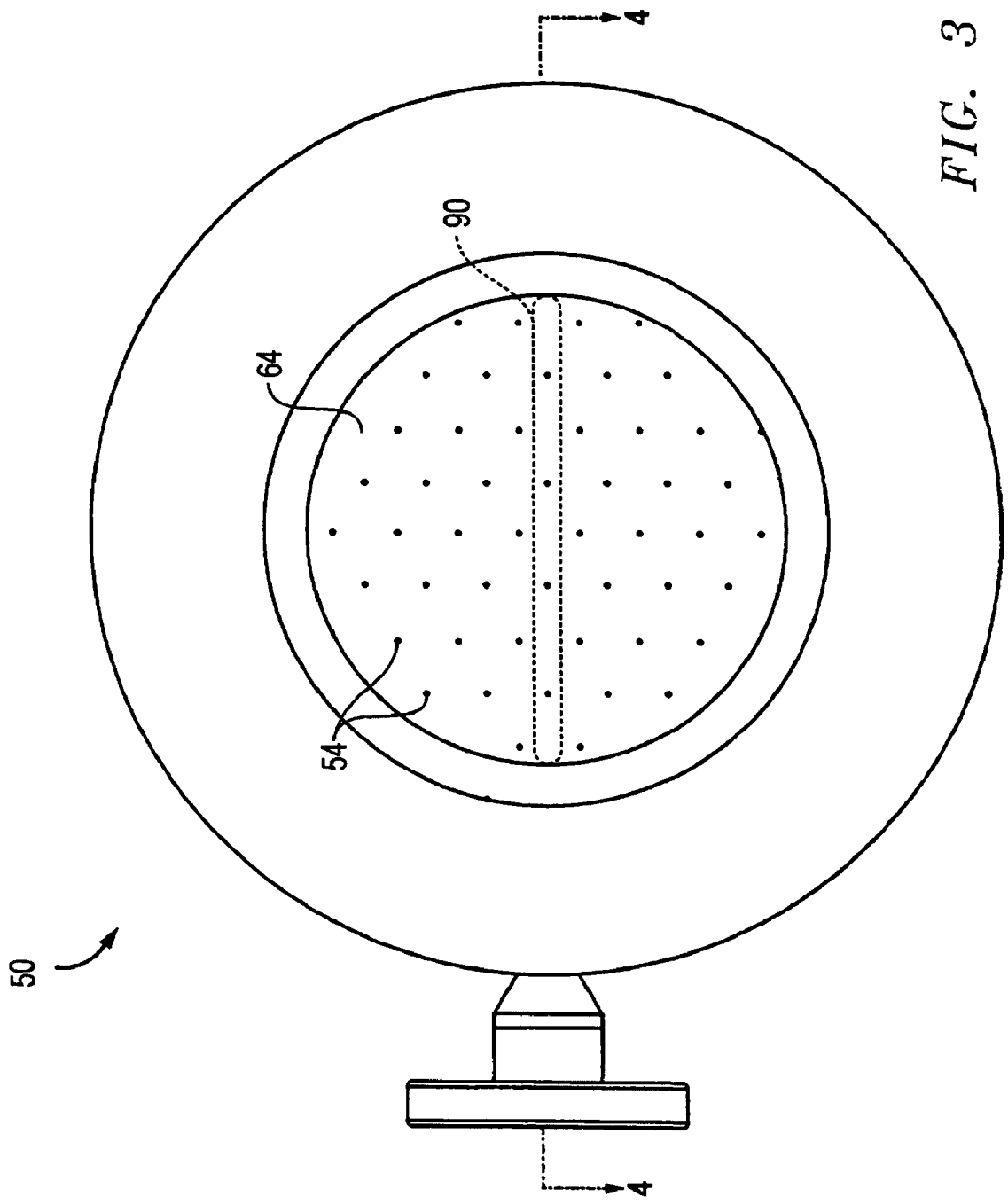
FIG. 3 is a right end view of a sparging device embodying the principles of the invention having a multiple stage sparging screen.

Referring to FIG. 2, a sparging screen 10 embodying the principles of the invention includes a screen body (which may also be referred to herein as a "device body") made up of a first or inlet side component 11 and a second or outlet side component 12. A number of screen passages, each shown generally by reference numeral 14, extend through the sparging screen body from a first side 17 of the screen body to a second side 18 of the screen body. As shown best in FIG. 1, the screen passages 14 are spaced apart across the entire area of the disk-shaped screen body. The illustrated arrangement of screen passages 14 includes an outer set of passages shown generally at reference numeral 20 and an inner set of passages shown at reference numeral 21. Each set 20 and 21 is made up of a number of pairs 22 of generally radially aligned screen passages 14, with each pair at a different angular orientation about a center point 23 of the screen body.

As shown best in FIG. 2, sparging screen 10 also includes a fluid chamber 25 formed within the screen body. In this form of the invention, fluid chamber 25 is defined between the opposing surfaces of first side component 11 and second side component 12. Fluid chamber 25 may be formed between the two components 11 and 12 by areas machined or otherwise formed in one or both of the opposing surfaces. Fluid chamber 25 is in fluid communication with an inner ring 27 associated with inner screen passage set 21 and an outer ring 28 associated with outer screen passage set 20. Both the inner ring 27 and outer ring 28 are connected to a feed passage 30 formed in first side component 11 and terminating at an inlet port 31 formed in the first side component. Inlet port 31 comprises a fitting for connecting with a suitable processing fluid supply conduit (not shown). The combination of feed passage 30, and inner and outer rings, 27 and 28 respectively, provide fluid communication from inlet port 31 to fluid chamber 25.

The sparging screen 10 shown in FIGS. 1 and 2 includes a fluid communication structure associated with each screen passage 14. This fluid communication structure is formed in a cylindrical sleeve 34 which is best shown in the section view of FIG. 2 captured between first side component 11 and second side component 12. Each sleeve comprises a tube oriented so that the sides of the respective sleeve 34 separate the area of fluid chamber 25 from the area of the respective screen passage 14. Thus, the inner surface of the respective sleeve 34 actually defines a central portion of the respective screen passage 14, with the remainder of the respective screen passage being defined by an opening 37 formed in first side component 11 and an opening 38 formed in second side component 12. In some forms of the invention the fluid communication structure included in a sleeve 34 may include small openings extending transversely from the outer surface of the cylindrical shape to the inner surface. Other forms of the invention may utilize sleeves 34 made up of a porous and permeable material. In the case of porous and permeable material making up sleeves, the porous and permeable material represent the fluid communication structure. Whether the fluid communication structure includes discrete openings through the sleeve 34 of porous and permeable material in the sleeve, the fluid communication structure in each sleeve 34 provides fluid communication from fluid chamber 25 to the respective screen passage 14.

The two side components 11 and 12 of screen 10 shown in FIG. 2 may be held together in any suitable fashion in a sparging device embodying the principles of the present invention. For example, the two side components 11 and 12 may be sandwiched between flanges (not shown) in a sparging device or may otherwise be bolted together. The illustrated disk-shaped screen 10 made up of side components 11 and 12 is especially adapted to be used as a grinder plate in a grinder device. Thus, screen 10 includes a central opening 40 for accommodating a spindle associated with the grinding device.

Figure 4:
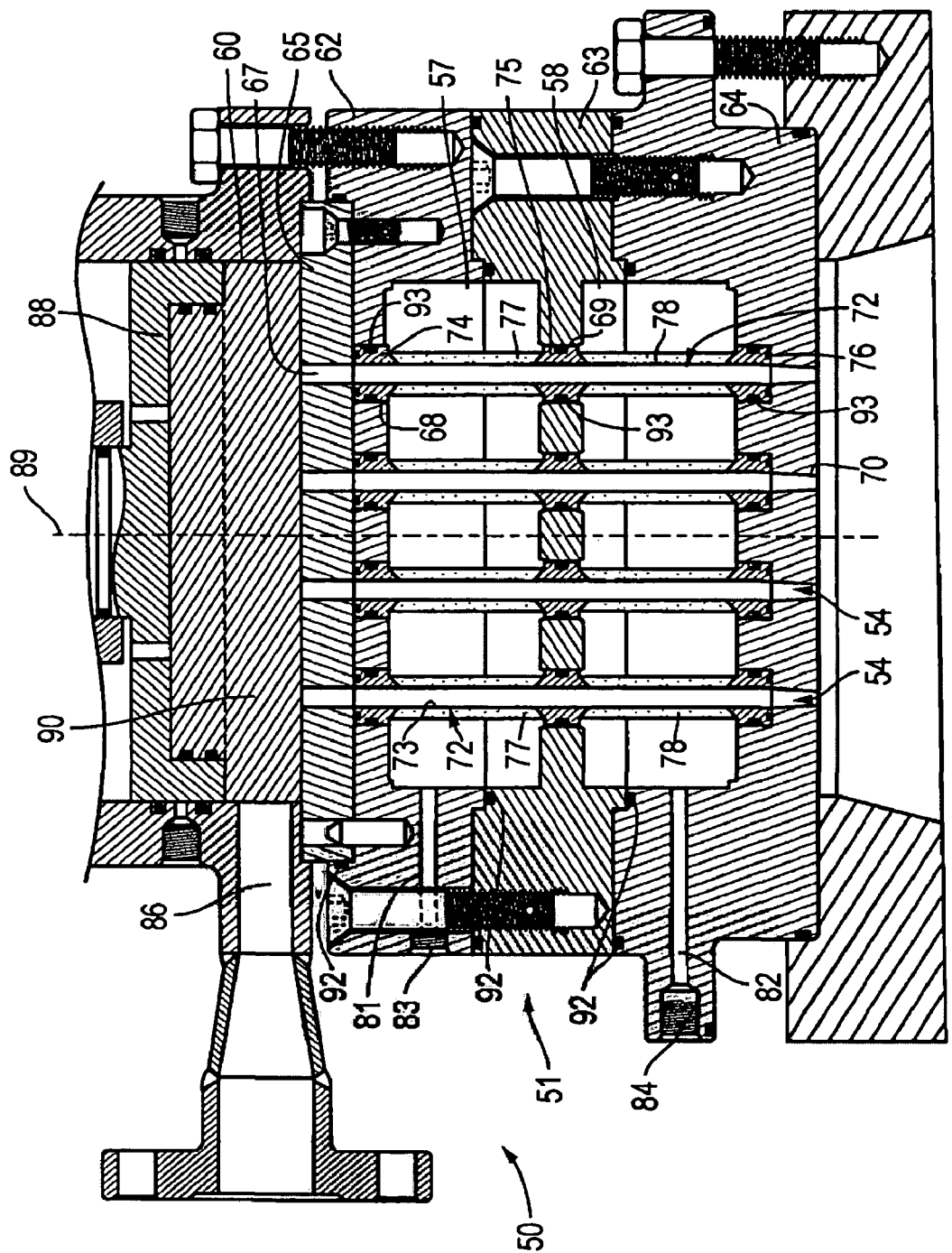
FIG. 4 is a longitudinal section view taken along line 4-4 in FIG. 3.

Referring to FIGS. 3 and 4 a multiple-stage sparging device 50 embodying the principles of the invention includes a device body 51 (shown in only in FIG. 4) having multiple fluid chambers for adding different processing fluids to a foodstuff passing through sparger passages 54 in the device body. Referring particularly to FIG. 4, this form of the invention includes two different fluid chambers, a first fluid chamber indicated generally at reference numeral 57 and a second fluid chamber indicated generally at reference numeral 58. Device body 51 is connected to an inlet chamber 60 through which foodstuff may be introduced to the various sparger passages 54 and forced through the passages.

In the form of the invention shown in FIGS. 3 and 4, device body 51 includes an inlet side component 62, an intermediate component 63, and an outlet side component 64. Intermediate component 63 is sandwiched between inlet side component 62 and outlet side component 64. First fluid chamber 57 is defined between the facing surfaces of inlet side component 62 and intermediate component 63, while second fluid chamber 58 is defined between the facing surfaces of intermediate component 63 and outlet side component 64. Sparger screen body 51 in this form of the invention also includes a scraper plate 65 interposed between inlet side component 62 and inlet chamber 60. This scraper plate 65 provides a surface against which a scraper blade or grinder blade may work as will be described further below.

It will be appreciated especially from the section view of FIG. 4 that inlet side component 62, intermediate component 63, outlet side component 64, and scraper plate 65 each include transverse openings that align to either make up part of the respective sparger passage 54 or make room for the respective sparger passage. In particular, scraper plate 65 includes transverse openings 67, inlet side component 62 includes openings 68, intermediate component 63 includes openings 69, and outlet side component 64 includes openings 70. These aligned openings 68, 69, and 70 provide a respective sleeve receiving opening for receiving a sleeve 72. The bulk of each sparger passage 54 in the form of the invention shown in FIGS. 3 and 4 is defined by the respective sleeve 72 captured in the device body 51 between scraper plate 65 and outlet component 64. Each sleeve 72 fits in a recess defined by openings 68, 69, and 70.

The particular sleeve 72 shown in FIG. 4 comprises a single tubular component having a generally uniform cylindrical inner surface 73 formed through solid material sections 74, 75, and 76, and two porous and permeable material sections 77 and 78. Porous and permeable material section 77 aligns with first fluid chamber 57 while porous and permeable material section 78 aligns with second fluid chamber 58. Thus, the porous and permeable material 77 represents a fluid communication structure that allows fluid to be communicated from fluid chamber 57 to sparger passage 54 and porous and permeable material 78 represents a fluid communication structure that allows fluid to be communicated from second fluid chamber 58 to the sparger passage. As with the sleeve 34 shown in the embodiment of FIGS. 1 and 2, the fluid communication structure in this multiple-stage form of the invention may alternatively include small openings drilled or otherwise formed through the sleeve material from the outside surface of the cylindrical shape to the inside surface.

Each fluid chamber 57 and 58 formed in device body 51 may be used to add a different processing fluid to the foodstuff as the foodstuff is forced through sparger passages 54. Thus, each fluid chamber 57 and 58 is associated with a different processing fluid inlet or feed structure for feeding a desired processing fluid into the respective fluid chamber. The feed structures shown in FIG. 4 include a first inlet passage 81 associated with first fluid chamber 57 and a second inlet passage 82 associated with second fluid chamber 58. First inlet passage 81 extends through inlet side component 62 from a fitting 83 formed in an exterior surface of the inlet side component to an interior surface defining a portion of first fluid chamber 57. Similarly, second inlet passage 82 extends through outlet side component 64 from an exterior fitting 84 to an interior surface defining a portion of second fluid chamber 58.

As shown in FIG. 4, inlet chamber 60 is in communication with a foodstuff inlet port 86 through which foodstuff may be introduced into the inlet chamber. A pressure auger 88 may be associated with inlet chamber 60. Auger 88 is driven about an auger axis 89 by a suitable driving arrangement (not shown) to force the foodstuff from inlet chamber 60 into sparger passages 54. Also, inlet chamber 60 may house a scraper blade assembly 90 mounted at the end of auger 88 and adapted to rotate with the auger. As best shown in FIG. 3, the illustrated scraper blade 90 comprises a single elongated element. Other forms of the invention may include scraper blades having several generally radially extending blade elements. In any case, the scraper blade periodically passes over scraper plate openings 67 to sever material against the entrance edge of these openings. This cutting action is analogous to the cutting action at the plate of a meat grinding device. It will be noted that the orientation of scraper blade 90 shown in FIGS. 3 and 4 is such that the section view of FIG. 4 coincides with the longitudinal axis of the scraper blade. Thus, the section view of FIG. 4 shows the scraper blade 90 completely filling the area defined by inlet chamber 60. It will be appreciated from FIG. 3, however, that scraper blade 90 occupies only a small portion of the inlet chamber so that the foodstuff to be treated may enter chamber 60 through inlet port 86 and then flow from chamber 60 into each of the sparger passages 54 extending through device body 51.

Although the forms of the invention shown in FIGS. 1 through 4 are preferred forms of the invention, those skilled in the art will appreciate that many variations in these devices are possible within the scope of the present invention as defined in the accompanying claims. For example, a sparging device embodying the principles of the invention may or may not include cutting elements for scraping an inlet surface to the sparger passages, such as the upper surface of plate 65 in FIG. 4. In particular, a finely ground or otherwise comminuted foodstuff may not require any cutting action at the inlet to the sparger passages. Also, numerous different arrangements other than an auger may be used to force the foodstuff through the sparger passages. In particular, in the arrangement shown in FIGS. 3 and 4, the foodstuff may be pumped into inlet chamber 60 through foodstuff inlet port 86 with sufficient force to drive the foodstuff through sparger passages 54.

Those skilled in the art will appreciate that many different arrangements may be used to connect the various components of the screen body. The components may be sandwiched between flanges formed on other components, or the components may themselves include bolt holes to accommodate bolts or other connectors for connecting the components together in the positions illustrated particularly in FIGS. 2 and 4. Many different sealing arrangements may also be used to seal between the various facing surfaces of a screen body embodying the principles of the invention. For example, FIG. 4 shows O-rings 92 providing a seal between the facing surfaces of inlet side component 62, intermediate component 63, outlet side component 64, and scraper plate 65. FIG. 4 also shows O-rings 93 associated with the solid material sections of sleeves 72. These sealing arrangements are shown only for purposes of example and are not intended to limit the scope of the invention as defined in the following claims.

The sparger or screen passages 14 and 54 shown in the two illustrated embodiments of the invention are preferably relatively small in diameter. For example, each passage may have a diameter of around one-half inch or less, although larger diameters are possible within the scope of the invention. The use of relatively small diameter sparger passages facilitates better contact between the processing fluid and the foodstuff passing through the sparger passages. Also, the length of the areas provided for processing fluid communication to the sparger passages may vary widely within the scope of the invention. FIG. 2, for example shows a relatively short sleeve 34, while the porous and permeable sections 77 and 78 are relatively long. Generally, the longer the area provided for fluid communication between the respective chamber and the sparger passage, the more processing fluid that can be sparged into the foodstuff.

The form of the invention shown in FIG. 4 includes openings 70 in outlet side component 64 that taper narrower toward their respective outlet end. This taper is included to provide increased resistance to the flow of foodstuff through passages 54. The increased resistance results in higher pressures within flow passages 54. This increased pressure allows the processing fluid to be sparged into the foodstuff through chambers 57 and 58 at a higher pressure. The higher sparging pressure may be advantageous for certain foodstuffs and certain processing fluids.

As shown in FIG. 1, device body 10 has a circular shape in a plane transverse to the longitudinal axis of each respective screen passage 14 and sleeve 34. Similarly, the various components making up device body 50 have a circular shape in a plane transverse to the longitudinal axis of each respective sleeve 72. This circular arrangement is particularly applicable to forms of the invention used with a scraper blade at an input side of the device body; however, this circular shape is not necessary to implement the present invention.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Any use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A sparging screen including:
   (a) a number of screen passages extending transversely through a screen body from a first side of the screen body to a second side of the screen body, the screen body including a first side component and a second side component, the first side component including a first portion of each respective screen passage and the second side component including a second portion of each respective screen passage;
   (b) a fluid chamber within the screen body;
   (c) each respective screen passage having a respective sleeve positioned between the first side component and the second side component, the respective sleeve comprising a tube having an inner surface and an outer surface, the respective sleeve being oriented with respect to the first side component and second side component such that the inner surface defines a middle portion of the respective screen passage between the first portion and second portion of the respective screen passage; and
   (d) a fluid communication structure positioned in a respective one of the sleeves so as to extend transversely between the respective inner surface and outer surface, the fluid communication structure providing fluid communication from the fluid chamber to the screen passage area defined by the respective sleeve.

2. The apparatus of claim 1 wherein each respective sleeve has positioned therein a respective fluid communication structure extending transversely between the respective inner surface and outer surface, the respective fluid communication structure providing fluid communication from the fluid chamber to the screen passage area defined by the respective sleeve.

3. The apparatus of claim 1 wherein the fluid communication structure includes one or more fluid flow openings extending transversely through the material making up the respective sleeve.

4. The apparatus of claim 1 wherein the fluid communication structure includes a porous and permeable material.

5. The apparatus of claim 1 wherein the fluid chamber is formed between an inner face of the first side component and an inner face of the second side component.

6. The apparatus of claim 1 wherein each sleeve comprises a cylindrical tube.

7. The apparatus of claim 1 wherein the screen body has a circular shape in a plane transverse to the longitudinal axis of each respective screen passage.

8. An apparatus including:
   (a) a device body including a first side component and a second side component, and further including an intermediate component sandwiched between the first side component and second side component, the first side component having a number of spaced apart openings, each opening extending transversely to a plane defined by the first side component and corresponding to a respective opening through the intermediate component and a respective opening through the second side component, each set of corresponding openings through the first side component, intermediate component, and second side component providing a respective sleeve receiving area in the device body;
   (b) a first fluid chamber defined within the device body, and a second fluid chamber defined within the device body;
   (c) a respective sleeve positioned within each respective sleeve receiving area in the device body, each respective sleeve comprising a tube extending from at least the first side component to the second side component transversely to the plane defined by the first side component;
   (d) a respective first fluid communication structure formed in a respective one of the sleeves and located in that respective sleeve between the first side component and the intermediate component, the first fluid communication structure providing fluid communication from the first fluid chamber to an interior area defined by the respective sleeve; and
   (e) a respective second fluid communication structure formed in a respective one of the sleeves and located in that respective sleeve between the intermediate component and the second side component, the second fluid communication structure providing fluid communication from the second fluid chamber to an interior area defined by the respective sleeve.

9. The apparatus of claim 8 wherein each sleeve includes:
   (a) a respective first fluid communication structure located in that sleeve between the first side component and the intermediate component; and
   (b) a respective second fluid communication structure located in that sleeve between the intermediate component and the second side component.

10. The apparatus of claim 8 wherein the respective first fluid communication structure and respective second fluid communication structure each include one or more openings extending transverse to a longitudinal axis of the respective sleeve.

11. The apparatus of claim 8 wherein the respective first fluid communication structure and respective second fluid communication structure each include one or more sections of porous and permeable material.

12. The apparatus of claim 8 wherein the first fluid chamber is defined between the first side component and the intermediate component, and the second fluid chamber is defined between the intermediate component and the second side component.

13. The apparatus of claim 8 wherein each sleeve includes a sealing structure positioned in the respective opening of the intermediate component through which that sleeve extends.

14. The apparatus of claim 8 wherein the device body has a circular shape in a plane transverse to the longitudinal axis of each respective sleeve.

15. An apparatus including:
(a) a device body including a first side component and a second side component, the first side component having a number of spaced apart openings, each opening extending transversely to a plane defined by the first side component and corresponding to a respective opening through the second side component, each set of corresponding openings through the first side component and second side component including a respective sleeve receiving area in the device body;
(b) a fluid chamber defined within the device body;
(c) a respective sleeve positioned within each respective sleeve receiving area in the device body, each respective sleeve comprising a tube extending from at least the first side component to the second side component transversely to the plane defined by the first side component; and
(d) a fluid communication structure formed in a respective one of the sleeves and located in that respective sleeve between the first side component and the second side component, the fluid communication structure providing fluid communication from the fluid chamber to an interior area defined by the respective sleeve.

16. The apparatus of claim 15 wherein each sleeve includes a respective fluid communication structure located in that sleeve between the first side component and the second side component.

17. The apparatus of claim 15 wherein each respective fluid communication structure includes one or more openings extending transverse to a longitudinal axis of the respective sleeve.

18. The apparatus of claim 15 wherein each respective fluid communication structure includes one or more sections of porous and permeable material.

19. The apparatus of claim 15 wherein the fluid chamber is defined between the first side component and the second side component.

20. The apparatus of claim 15 wherein the device body has a circular shape in a plane transverse to the longitudinal axis of each respective sleeve.

* * * * *